United States Patent
El Mghazli et al.

(10) Patent No.: US 8,593,949 B2
(45) Date of Patent: Nov. 26, 2013

(54) METHOD FOR MANAGING AN INTERCONNECTION BETWEEN TELECOMMUNICATION NETWORKS AND DEVICE IMPLEMENTING THIS METHOD

(75) Inventors: Yacine El Mghazli, Arcueil (FR); Olivier Marce, Massy (FR)

(73) Assignee: Alcatel Lucent, Paris (FR)

( * ) Notice: Subject to any disclaimer, the term of this patent is extended or adjusted under 35 U.S.C. 154(b) by 1784 days.

(21) Appl. No.: 11/571,039

(22) PCT Filed: Jun. 23, 2005

(86) PCT No.: PCT/FR2005/050483
§ 371 (c)(1),
(2), (4) Date: Feb. 7, 2007

(87) PCT Pub. No.: WO2006/090024
PCT Pub. Date: Aug. 31, 2006

(65) Prior Publication Data
US 2008/0285570 A1   Nov. 20, 2008

(30) Foreign Application Priority Data

Jun. 25, 2004  (FR) ..................... 04 51333

(51) Int. Cl.
*G01R 31/08*  (2006.01)
*H04L 12/28*  (2006.01)
*G06F 15/173*  (2006.01)

(52) U.S. Cl.
USPC ............ 370/230; 370/392; 370/400; 709/225

(58) Field of Classification Search
USPC ..................... 370/389–392; 726/15
See application file for complete search history.

(56) References Cited

U.S. PATENT DOCUMENTS

| 6,625,118 | B1* | 9/2003 | Hadi Salim et al. | 370/229 |
| 6,963,575 | B1* | 11/2005 | Sistanizadeh et al. | 370/404 |
| 2003/0177221 | A1* | 9/2003 | Ould-Brahim et al. | 709/223 |
| 2003/0228147 | A1* | 12/2003 | Brahim | 398/50 |
| 2004/0081154 | A1* | 4/2004 | Kouvelas | 370/392 |
| 2004/0093492 | A1* | 5/2004 | Daude et al. | 713/156 |
| 2004/0156313 | A1* | 8/2004 | Hofmeister et al. | 370/229 |
| 2004/0255028 | A1* | 12/2004 | Chu et al. | 709/227 |
| 2004/0260937 | A1* | 12/2004 | Narayanan | 713/200 |
| 2006/0002394 | A1* | 1/2006 | Kuranari et al. | 370/392 |

OTHER PUBLICATIONS

E. Rosen et al, "BGP/MPL VPNs RFC2547bis", IETF Draft, Jul. 2002 XP002242692.
T. Bates et al, "Multiprotocol Extensions for BGP-4"—Network Working Group Request for Comments, Jun. 1, 2000, pp. 1-11, XP002190777.

* cited by examiner

*Primary Examiner* — Brandon Renner
(74) *Attorney, Agent, or Firm* — Harness, Dickey & Pierce

(57) ABSTRACT

This invention concerns a method of managing a telecommunication network (232), referred to as the provider network (232), used to transmit data between at least two telecommunication client networks (204, 222) in order to create a virtual private network (200) between the client networks (204, 222), each of these client networks (204, 222) using an internal communication protocol, referred to as the internal client protocol, and each of the client networks (204, 222) having at least one client interconnection device (206, 220, 221) communicating with at least one provider interconnection device (208, 215) of the provider network (232).
According to this invention, the provider network (232) uses a communication protocol, referred to as the provider protocol, comprising extensions for the storage of information relating to the points of passage of the data in the client networks (204, 222).

11 Claims, 3 Drawing Sheets

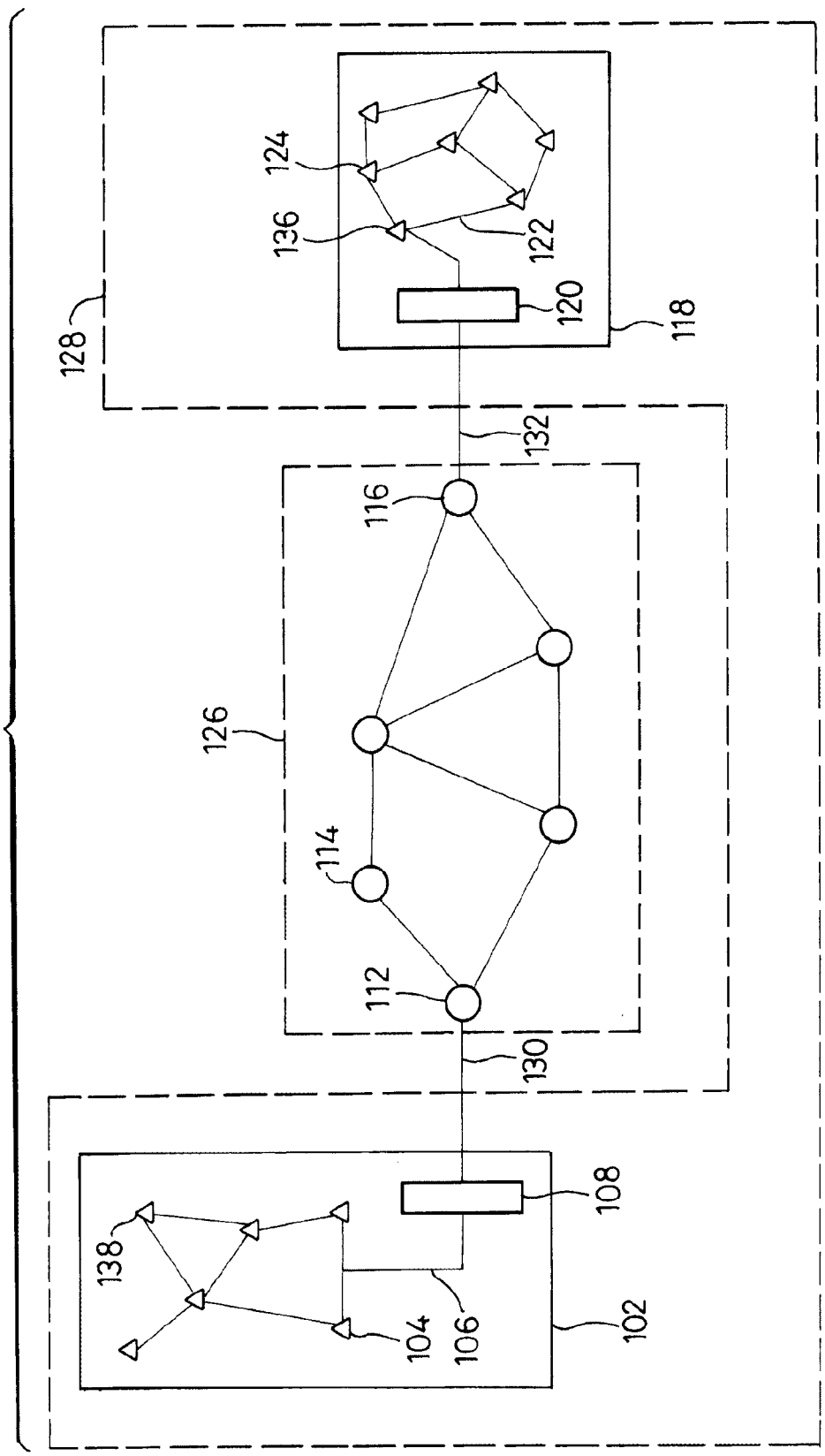

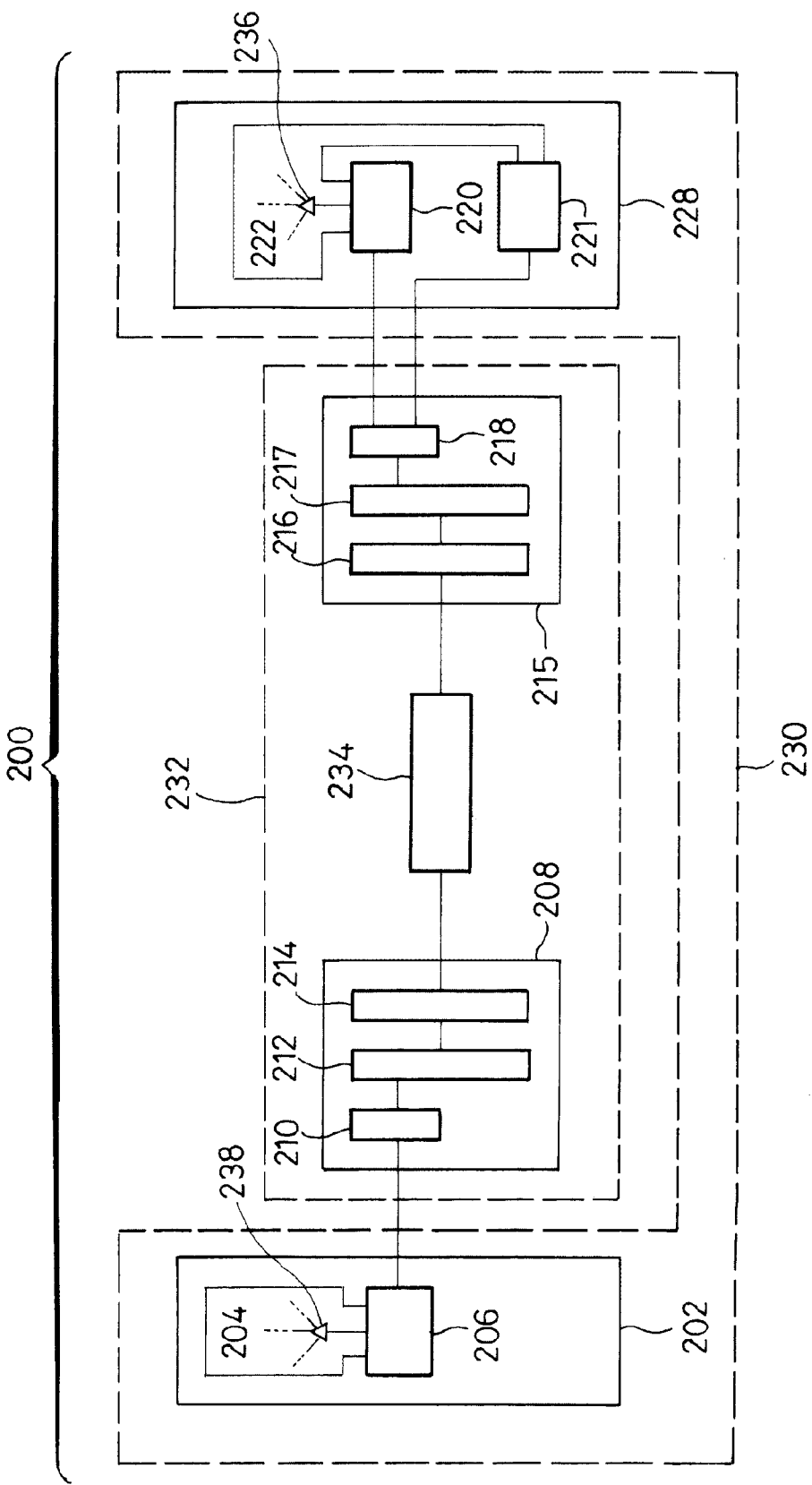
FIG_2

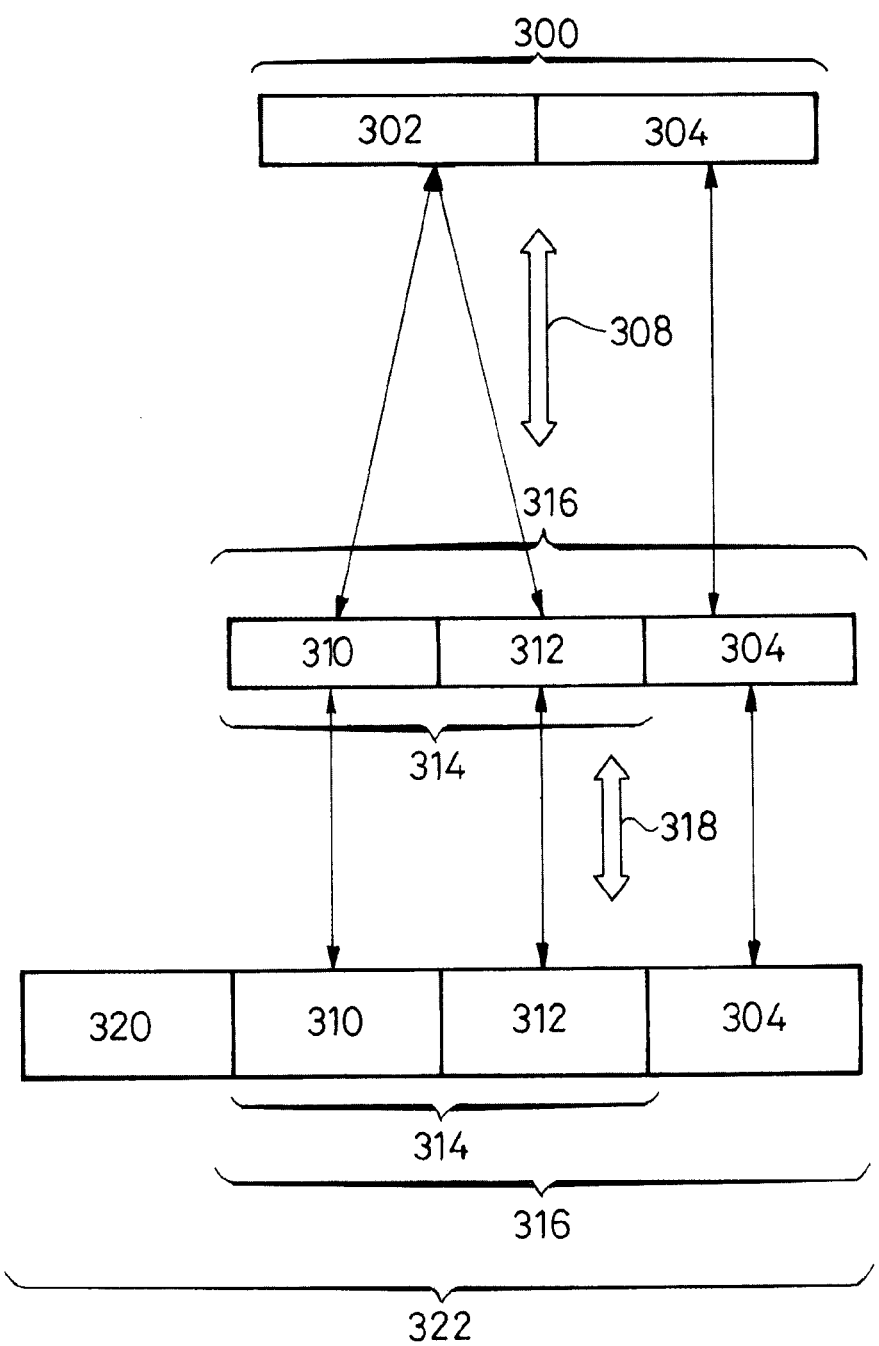

METHOD FOR MANAGING AN INTERCONNECTION BETWEEN TELECOMMUNICATION NETWORKS AND DEVICE IMPLEMENTING THIS METHOD

The present invention concerns a method for managing an interconnection between telecommunication networks and a device implementing this method.

A telecommunication network comprises a set of electronic devices, such as computers, printers or information storage devices, for example, which exchange data, in particular by means of interconnection devices called network nodes forming part of the network.

These interconnection devices generally comprise physical interconnection means ("hardware"), such as switches, and software interconnection means.

A telecommunication network can also communicate with devices external to that network, certain of its nodes serving as communication gateways to those external devices. These nodes are then called gateway devices or nodes.

Each device of a network has its own unique address that is used to send it information. Sending information from a first device to a second device via third party devices of the network is referred to as routing this information across the network.

To enable such routing, all the communication information in a given network is exchanged in accordance with the same routing protocol internal to the network, referred to as the Interior Gateway Protocol (IGP).

Moreover, networks referred to hereinafter as client networks are able to communicate with each other via third party communication networks referred to hereinafter as provider networks.

To facilitate interconnection of the client networks, the provider networks may comprise interfacing means for communicating with the various client networks so that a first device of a first client network is able to communicate with a second device of a second client network as if that second device were internal to the first client network. The provider network then becomes transparent for users of the client networks.

The provider network is then said to offer a Virtual Private Network (VPN) service and a virtual private network between the various client networks concerned is said to have been created in this way.

Also, the client networks connected in this way are managed as if they formed one network (in particular the set of addresses must be coherent and the set of client networks connected in this way must use the same Internal Routing Protocol (IGP)). All of these client networks interconnected in the VPN form a single administrative domain.

A virtual private network (VPN) 100 (FIG. 1) is described hereinafter. It comprises in particular a client network 106 having nodes 104 and electronic devices (not shown) attached to the network 106, located on a geographical site 102.

The VPN also comprises another client network 122, containing in particular network nodes 124 and electronic devices (not shown) attached to the network 122, located on a geographical site 118.

A provider network 126 interconnects the client networks 106 and 122. The two client networks 106 and 122 connected by the provider network 126 are then said to form a single autonomous administrative domain 128 called the client domain 128.

Moreover, the provider network 126 comprises in particular nodes 112, 114 and 116 that manage communication channels internal to the network 126.

Certain of these nodes 112 and 116, called provider gateway nodes, have other functions, in particular that of linking the network 126 and what is external to that network 126.

To connect the client networks 106 or 122 to the provider network 126, a client gateway node 108 or 120 is connected to a provider gateway node 112 or 116 by means of a boundary link 130 or 132 so that data therefore circulates between the network 106 and the network 122 across the network 126.

It is also known to use an Internal Routing Protocol (IGP) for communication in the client administrative domain 128.

Known IGP include, for example:

the Open Shortest Path First (OSPF) protocol,
the Intermediate System to Intermediate System (IS-IS) protocol,
the Routing Information Protocol (RIP).

Communication outside the administrative domain of the client 128 uses an external routing protocol called the External Gateway Protocol (EGP).

One EGP used is the Border Gateway Protocol (BGP), for example.

A problem for the network 126 stems from the use of software and hardware means providing satisfactory transport of data, and in particular ensuring that the data is coherent (for example by respecting the order of the transmission packets if the data is transmitted in packets), their integrity (if the data is encrypted) and their destination (by interpreting the addresses coming from the communication system of the client).

One standard covering VPN management is the RFC 2547bis standard of the IETF (Internet Engineering Task Force), also known as the BGP/MPLS (Border Gateway Protocol/Multiprotocol Label Switching) standard.

In fact, the BGP/MPLS standard is the result of combining the BGP and the Multiprotocol Label Switching (MPLS) method (which is a method for setting up one or more virtual circuits or MPLS tunnels in the network 126).

If the internal routing protocol in the administrative domain of the client 128 is the RIP, and if a 2547bis VPN is used for network management, then a provider gateway node, such as the node 112 or the node 116, is able to communicate with the corresponding client gateway node, respectively the node 108 or the node 120, using the RIP.

The present invention stems from the observation that, in the context of the 2547bis standard, it is not possible to establish communication between two client gateway nodes (such as the node 108 and the node 118) belonging to the same domain using the RIP at the same time as ensuring that the provider network is transparent for the user of the client networks.

According to an observation that is specific to the invention, it is apparent that the BGP cannot include all the required parameters for the RIP necessary for the correct routing of data.

In particular, the BGP does not provide at present specific objects or parameters for encapsulating information relating to the points of passage of the information in a network using the RIP, although that information is contained in the data circulating in a network using the RIP, which causes a loss of information at the RIP/BGP interface.

Such failures of compatibility can have serious consequences. For example, for security reasons it may be required that all messages entering the administrative domain 128 pass through a security server (or "firewall") 136 situated in the network 122.

It may happen that one of these incoming messages is addressed to an electronic device 138 situated in the network 104.

Arriving at any entry point of the domain 128, this message is redirected to the server 136. Once the message has passed through the server 136, and if there are no security problems, the message is then redirected to the gateway node 120 and then to the provider gateway node 116.

The message is then transported by the provider network 126 to the provider gateway node 112 and then to the client gateway node 108. As the BGP has no extensions to contain, inter alia, the points of passage of the message, the client gateway node 108 cannot determine that the message has already passed through (and has therefore been filtered by) the security server 136.

The node 108 therefore forwards the message to the server 136. The message is therefore put into a permanent loop from which it cannot exit: a perpetual loop is obtained.

This serious problem leads to other problems in achieving cohabitation of an administrative domain using the RIP with the VPN 2547bis standard, in particular on replacing a transport network using the RIP with a BGP/MPLS VPN solution (for example in the context of a provider service offer to a client using RIP), namely:

- The administrators of an administrative domain must be trained and must use gateway protocols other than the RIP routing protocol used as the internal routing protocol in their domain.
- The client gateway nodes must be able to communicate with protocols other than the one that they use vis-à-vis the client domain to interface with the provider gateway nodes.

The present invention aims to solve at least one of the problems identified hereinabove. This is why the invention relates to a method of managing a telecommunication network, referred to as the provider network, used to transmit data between at least two telecommunication client networks in order to create a virtual private network between the client networks, each of these client networks using an internal communication protocol, referred to as the internal client protocol, and each of the client networks having at least one client interconnection device communicating with at least one provider interconnection device of the provider network, characterized in that the provider network uses a communication protocol, referred to as the provider protocol, comprising extensions for the storage of information relating to the points of passage of the data in the client networks.

Thanks to this invention, it is possible to provide point-to-point communication between the gateway nodes of different client networks across the provider network that ensures the integrity of the data transmitted by the provider network, and in particular of the data relating to the points of passage.

A method conforming to the invention uses means that enable integration of all data specific to the RIP.

A perpetual loop in the communication of data, as described with reference to the prior art, cannot occur, with the result that the routing of data is guaranteed.

Also, service providers can provide VPN services for creating a virtual private network connecting at least two client networks belonging to the same domain using an internal protocol such as the RIP without the administrators of those client networks having to take account of protocols other than their internal protocol.

Similarly, the client gateway nodes use only the internal protocol of the client network concerned.

Moreover, and thanks to the advantages of this invention cited hereinabove, it is very easy to change a provider network using a protocol such as the RIP into a provider network utilizing a method conforming to the invention since, thanks to this invention, no change is required at the level of the client network.

In one embodiment, the internal client protocol used by the client networks is the Routing Information Protocol.

In one embodiment, the extensions contain information identifying the virtual private network vis-à-vis the provider network.

In one embodiment, the multiprotocol label switching communication method is used in the provider network.

In one embodiment, the provider protocol and the multiprotocol label switching communication method are interfaced.

The invention also concerns an interconnection device. According to the invention, the interconnection device comprises means for implementing any of the foregoing embodiments of the method.

In one embodiment, the interconnection device comprises a router.

In one embodiment, the interconnection device comprises a server.

In one embodiment, the interconnection device comprises means for opening, managing and closing one or more internal client protocol sessions.

In one embodiment, the interconnection device comprises interfacing means between the internal client protocol of the client networks and the provider protocol.

In one embodiment, the interconnection device comprises interface means between the provider protocol and the multiprotocol label switching communication method.

It should be noted that the invention provides that calls transmitted by the provider network provide an extension that is used only when the client network uses a particular protocol, namely a protocol memorizing the points of passage of the data.

This kind of approach goes against optimizing the throughput of traffic in the provider network because, if the client network utilizes a protocol that does not memorize the points of passage of the data, this extension does not transmit information and limits the performance of the provider network.

Nevertheless, the invention has the inventive feature that results in opting to give preference to the reliability of the VPN over the throughput transmitted by the network.

Moreover, it should also be noted that the provider network does not memorize the points of passage in the provider network, in order for the latter to remain transparent vis-à-vis users of the client networks.

Other features and advantages of the invention will become apparent from the following description given by way of nonlimiting example with reference to the appended figures, in which:

FIG. 1, already described, represents diagrammatically a prior art virtual private network, FIG. 2 represents diagrammatically a virtual private network linking two client networks in accordance with the invention, and FIG. 3 is a diagrammatic representation of the processing of data for the transport thereof in a virtual private network by a method conforming to the invention.

FIG. 2 represents diagrammatically one embodiment of the invention. A provider network 232 is used to provide a VPN 200 between two client networks 204 and 222 on respective geographical sites 202 and 228.

The network 204 comprises a client gateway node 206.

The client network 222 comprises two client gateway nodes 220 and 221.

To offer the VPN service, the provider network 232 (which may be a series of interconnected networks), containing in particular, in its data transport part 234, a series of network nodes using multiprotocol label switching (MPLS) to transport data between a first interconnection device 208 according to the invention, also called a provider gateway node 208, and a second interconnection device 215 according to the invention, also called a provider gateway node 215.

According to the invention, new extensions are added to the BGP, which then becomes the BGP_RIP, to enable it in particular to convey all the necessary information contained in a call using the RIP together with information necessary for identifying the VPN 200.

The provider gateway node 208 contains in particular:
software and hardware means 210 for opening, managing and closing one or more RIP sessions, referred to as RIP session means 210,
software and hardware interface means 212 between the RIP and the BGP_RIP, the means 212 being referred to as RIP/BGP_RIP means 212,
software and hardware means 214, referred to as BGP_RIP/MPLS adaptation means 214, between the BGP_RIP and the MPLS protocol comprising in particular the application of the MPLS label, in order to implement an MPLS tunnel along the transport network 234.

In an equivalent manner, the provider gateway node 215 contains in particular:
software and hardware means 218 analogous to the RIP session means 210, referred to as RIP session means 218 (for example FIG. 2 shows two RIP sessions open between the RIP session means 218 and the client gateway nodes 220 and 221),
RIP/BGP_RIP means 217 analogous to the RIP/BGP_RIP means 212,
BGP_RIP/MPLS means 216 analogous to the BGP_RIP/MPLS means 214.

More precisely, FIG. 3 shows diagrammatically the processing of an RIP message 300 coming from a client site and going to another client site via the provider network.

In the administrative domain of the client 230, the message 300 has, for example, a structure grouping information 304 to be transported by the network and management data 302 specific to the management domain of the client 230, including in particular the destination address of the information 304.

It must be noted that all of this data conforms to the protocol used by the client, namely the RIP in this example.

If the addressee of the message 300 is on the site 228, for example, whereas the sender is on the site 202, the message 300 must use the provider 232 to reach the other site 228, where it is directed to its addressee.

In fact, this other site 228, being part of the same administrative domain, uses the same protocol (RIP) and the same addressing and routing system as the sending site 202.

To this end, in a step 308 executed in the RIP/BGP_RIP means 212 internal to the provider gateway node 208, after the message 300 has reached the node 208 via the session means 210, the RIP data 302 is placed in modules 310 implemented in the context of the BGP, already described, and in new extensions 312, in particular new objects, that are added to the BGP in the context of this invention.

The set 314 of modules 310 and extensions 312 forms the parameters of the new protocol (BGP_RIP), comprising the elements specific to the BGP and the new extensions necessary for the complete transportation of the RIP information.

Then, in a step 318 executed in the means 214 and conforming to the BGP_RIP/MPLS protocol, the set of data 316 is adapted to the MPLS protocol, in particular by adding a label 320 specific to the MPLS protocol that will be used to construct the virtual circuit or MPLS tunnel to the provider gateway node 215.

At the level of this node 215, the BGP_RIP/MPLS means 216 apply the reverse step 318 to the set 322 of data.

The interface means 217 conforming to the RIP/BGP_RIP protocol then execute the reverse step 308.

The RIP session means 218 can therefore send the client gateway node 220 or the client gateway node 221 the RIP message 300, which therefore reaches its addressee.

Of course, the VPN 200 renders the same service in the other direction between the site 228 and the site 202.

Accordingly, thanks to the invention, it may be verified in particular that:
the administrators of a client administrative domain use only and must know only the RIP routing protocol used as the internal routing protocol in their domain,
the client gateway nodes use only the client routing protocol as the external routing protocol to the provider gateway node.

Moreover, it must be noted that a plurality of RIP sessions may be opened in the provider gateway nodes.

Also, all the information pertinent to the RIP may be placed in a BGP_RIP coded message because the BGP_RIP is provided with supplementary extensions available for this purpose.

Thanks to this last feature, in particular by including in the BGP_RIP data the information concerning the points of passage of the information, the creation of perpetual or closed data loops is avoided.

In fact, returning to the example considered with reference to the prior art, security considerations may impose that all messages incoming to the administrative domain of the client 230 pass through a security server 236 situated in the network 222 of the client 230.

And it is possible that this incoming message is intended for an electronic device connected to the node 238 situated in the network 204. In this case, a message arriving at any entry point of the client 230 is redirected to the server 236.

Once the message has passed through the server 236, the message is redirected to the client gateway node 220 and then to the provider gateway node 215.

The message is then transported by the provider network 234 to the provider gateway node 208 and then to the client gateway node 206.

As the BGP_RIP has extensions for containing among other things the points of passage of the message, the client gateway node 206 knows that the message has passed through (and has therefore been filtered by) the security server 236. The node 206 can then allow the message to pass through it, directing it to the electronic device associated with the destination node 238.

This invention lends itself to many variants. In particular, the RIP session means 210, the RIP/BGP_RIP means 212, and the BGP_RIP/MPLS adaptation means 214 may be part of the same device, associated in pairs in the same device, or each integrated into a different device.

The invention claimed is:

1. A method of managing a provider network having a provider protocol, the provider network having at least one provider interconnection device for facilitating transmission of messages between at least two client networks in order to create a virtual private network between the two client networks, each of the two client networks using an internal client protocol and having at least one client device to communicate with the at least one provider interconnection device, comprising
   receiving, by the least one provider interconnection device, a message from a first client device in a first client network addressed to a second client device in a second client network, the message being received according to the internal client protocol of the two client networks;
   transferring, by the at least one provider interconnection device, data associated with the internal client protocol from the received message into a set of modules associated with a border gateway protocol (BGP); and
   adding, by the at least one provider interconnection device, an extension to the BGP, the extension providing information on which points the message has passed through in at least one of the two client networks, wherein the extension and the set of modules form parameters of a protocol associated with both the BGP and the internal client protocol.

2. The method according to claim 1, wherein the internal client protocol used by the two networks is the Routing Information Protocol.

3. The method according to claim 1, wherein the extension includes information identifying the virtual private network vis-à-vis the provider network.

4. The method according to claim 1, wherein the provider network uses a multiprotocol label switching communication method.

5. The method according to claim 4, wherein the provider protocol and the multiprotocol label switching communication method are interfaced.

6. The method of claim 1, wherein the at least one provider interconnection device is a router.

7. The method of claim 1, wherein the at least one provider interconnection device is a server.

8. The method of claim 1, wherein the adding step further includes) opening, managing and closing one or more internal client protocol sessions.

9. The method of claim 1, wherein the at least one provider interconnection device includes an interface between the internal client protocol of the two client networks and the provider protocol.

10. The method of claim 1, wherein the at least one provider interconnection device includes an interface between the provider protocol and a multiprotocol label switching communication method.

11. A method for transferring data in a network, the method comprising:
   receiving, by a service provider gateway node, a message from a first client device in a first client network addressed to a second client device in a second client network, second client network being geographically remote from the first client network, the message including structure grouping information and management data information, the message being received according to the internal client protocol of the two client networks;
   transferring, by the service provider gateway node, data associated with the internal client protocol from the received message into a set of modules associated with a border gateway protocol (BGP);
   adding, by the service provider gateway node, an extension to the BGP, the extension providing information on which points the message has passed through in at least one of the first client network and the second client network, wherein the extension and the set of modules form parameters of a protocol associated with both the BGP and the internal client protocol; and
   forwarding, by the service provider gate node, the message with the added extension to the second client network.

* * * * *